(12) United States Patent
Veith et al.

(10) Patent No.: US 9,650,953 B2
(45) Date of Patent: May 16, 2017

(54) GAS TURBINE

(75) Inventors: Bjoern Veith, Regensdorf (CH); Carlos Simon-Delgado, Baden (CH); Daniel Seng, Wettingen (CH); Andreas Haubitz, Winterthur (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 1135 days.

(21) Appl. No.: 13/604,579

(22) Filed: Sep. 5, 2012

(65) Prior Publication Data

US 2013/0067933 A1    Mar. 21, 2013

(30) Foreign Application Priority Data

Sep. 12, 2011   (CH) ........................ 1500/11

(51) Int. Cl.
| | |
|---|---|
| F01D 25/12 | (2006.01) |
| F02C 3/04 | (2006.01) |
| F01D 5/08 | (2006.01) |
| F02C 3/08 | (2006.01) |
| F02C 7/18 | (2006.01) |

(52) U.S. Cl.
CPC ................ *F02C 3/04* (2013.01); *F01D 5/081* (2013.01); *F01D 5/082* (2013.01); *F01D 25/12* (2013.01); *F02C 3/08* (2013.01); *F02C 7/18* (2013.01)

(58) Field of Classification Search
CPC ...... F02C 3/08; F02C 6/06; F02C 7/12; F02C 7/18; F01D 25/12
USPC .......................................................... 60/806
See application file for complete search history.

(56) References Cited

U.S. PATENT DOCUMENTS

| | | | |
|---|---|---|---|
| 2,536,062 A * | 1/1951 | Kane ....................... | F02C 3/365 60/39.19 |
| 2,578,481 A | 12/1951 | Lombard | |
| 2,672,013 A | 3/1954 | Lundquist | |
| 4,005,572 A | 2/1977 | Giffhorn | |
| 5,163,285 A | 11/1992 | Mazeaud et al. | |
| 5,700,130 A | 12/1997 | Barbot et al. | |
| 6,389,793 B1 | 5/2002 | Priestley | |

(Continued)

FOREIGN PATENT DOCUMENTS

| | | |
|---|---|---|
| CN | 101372900 A | 2/2009 |
| CN | 101709673 A | 5/2010 |

(Continued)

OTHER PUBLICATIONS

Switzerland International Search Report, Dec. 9, 2011, 3 pp.

(Continued)

*Primary Examiner* — Mark Laurenzi
*Assistant Examiner* — Anthony Ayala Delgado
(74) *Attorney, Agent, or Firm* — Buchanan Ingersoll & Rooney PC

(57) ABSTRACT

A gas turbine is provided and includes a compressor, which via an air intake inducts and compresses air; a combustion chamber, in which a fuel is combusted using the compressed air, producing a hot gas; and a turbine, equipped with turbine blades, in which the hot gas is expanded, performing work. A first device is provided in order to cool turbine blades with compressed cooling air. The first device includes at least one separate compressor stage which produces compressed cooling air independently of the compressor.

7 Claims, 2 Drawing Sheets

(56) References Cited

U.S. PATENT DOCUMENTS

| | | | |
|---|---|---|---|
| 6,393,826 B1* | 5/2002 | Yamanaka | F02C 3/10 60/726 |
| 6,398,488 B1 | 6/2002 | Solda et al. | |
| 6,481,212 B2 | 11/2002 | Priestley | |
| 6,584,779 B2 | 7/2003 | Priestley | |
| 7,677,048 B1 | 3/2010 | Brostmeyer et al. | |
| 8,061,971 B2 | 11/2011 | Roush et al. | |
| 8,079,802 B2 | 12/2011 | Takamura et al. | |
| 8,087,249 B2 | 1/2012 | Ottaviano et al. | |
| 8,631,639 B2 | 1/2014 | Garcia-Crespo et al. | |
| 2002/0095937 A1 | 7/2002 | Priestley | |
| 2003/0051481 A1 | 3/2003 | Priestley | |
| 2006/0104808 A1 | 5/2006 | Dailey et al. | |
| 2009/0051167 A1 | 2/2009 | Dinu | |
| 2009/0104020 A1* | 4/2009 | Roush | F02C 6/08 415/145 |
| 2009/0110561 A1 | 4/2009 | Ramerth et al. | |
| 2009/0324386 A1 | 12/2009 | Takamura et al. | |
| 2010/0068035 A1 | 3/2010 | Roush et al. | |
| 2010/0154433 A1 | 6/2010 | Ottaviano et al. | |
| 2010/0247292 A1 | 9/2010 | Davis, Jr. et al. | |
| 2011/0181050 A1 | 7/2011 | Dinu | |
| 2012/0047906 A1 | 3/2012 | Dinu | |
| 2012/0227371 A1* | 9/2012 | Johnson | F01D 9/065 60/39.83 |

FOREIGN PATENT DOCUMENTS

| | | |
|---|---|---|
| CN | 101936220 A | 1/2011 |
| DE | 102007005010 | 8/2008 |
| EP | 1533473 | 5/2005 |
| EP | 2 206 902 A | 7/2010 |
| EP | 2 309 109 A1 | 4/2011 |
| GB | 2454248 | 5/2009 |
| JP | S47-035511 | 11/1972 |
| JP | S56-129725 A | 10/1981 |
| JP | S60-090600 U | 6/1985 |
| JP | H02-019613 A | 1/1990 |
| JP | H04-209934 A | 7/1992 |
| JP | H10-325361 A | 12/1998 |
| JP | 2001-303971 A | 10/2001 |
| JP | 2010-065699 A | 3/2010 |
| RU | 2 006 631 C1 | 1/1994 |
| WO | 2010/001655 A1 | 1/2010 |

OTHER PUBLICATIONS

Office Action (Notification of Reasons for Refusal) issued on Jan. 13, 2015, by the Japanese Patent Office in corresponding Japanese Patent Application No. 2012-199505, and an English Translation of the Office Action. (10 pages).

Office Action issued on Feb. 20, 2015, by the Russian Patent Office in corresponding Russian Patent Application No. 2012138960/06(063014), and a German translation of the Russian Office Action and a Google machine translation of the German translation. (9 pages).

Office Action issued on Feb. 28, 2015, by the State Intellectual Property Office, P.R. China in corresponding Chinese Patent Application No. 201210334322.0, and an English Translation of the Office Action. (18 pages).

Skubatschevskij GS, "Turbo Aircraft Engines, Construction and Interpretation," Moscow, publishing house "Maschinostrojenije," (1981), pp. 160-161 (with English translation) (total of 5 pages.).

Office Action issued on Mar. 7, 2014, by the Russian Patent Office in corresponding Russian Patent Application No. 2012138960. (5 pages).

* cited by examiner

GAS TURBINE

CROSS REFERENCE TO RELATED APPLICATION

The present application hereby claims priority under 35 U.S.C. Section 119 to Swiss Patent application number 01500/11, filed Sep. 12, 2011, the entire contents of which are hereby incorporated by reference.

FIELD OF INVENTION

The present invention relates to the field of gas turbine technology.

BACKGROUND

On account of the high thermal and mechanical stresses in gas turbines, it is necessary to supply most of the rotor blades and stator blades of the turbines with cooling air. In order to ensure correct cooling of the blades, a sufficiently high pressure ratio between cooling air and hot gas in the hot gas passage is necessary. As cooling air, mainly air is bled at bleed points of the gas-turbine axial compressor which are provided for it. By means of various piping systems, this is then fed to the individual turbine blades. An important point in the gas turbine design in this case is the correct selection of the pressure level of the bleed points to match the required pressure level of the turbine at the points which are to be cooled.

A greatly simplified schematic diagram for a gas turbine which is cooled in this way is reproduced in FIG. 1. The gas turbine 10 of FIG. 1 comprises a compressor 12, which, via an air intake 11, inducts and compresses air, a combustion chamber 13, in which a fuel 14, using the compressed air, is combusted and a hot gas is produced, and a turbine 15 equipped with turbine blades, in which the hot gas is expanded, performing work, and then discharged via an exhaust gas outlet 17, wherein for cooling the turbine 15 compressed cooling air is tapped from the compressor 12 and fed to the turbine 15 via a cooling air line 18. The bleed and feed can be carried out in this case at different points of the compressor 12 or of the turbine 15. For reducing the cooling air temperature, a cooler 19 can be additionally arranged in the cooling air line 18.

In the rear turbine stages in the flow direction, a rather low pressure level prevails. Furthermore, the thermal loads are mostly so low that active cooling of these stages is seldom necessary. Yet if active cooling of the last stages is required, for cost reasons a bleed point on the actively cooled blades which is operating at the next higher pressure level is used in most cases. Since this pressure level, however, lies above that which is actually required and the pressure is throttled in order to minimize the volume of cooling air, in this respect more work than is necessary is performed during the compression of the fluid. This additional work, as a result of the throttling of the pressure, occurs as a loss in the balance.

The provision of a separate bleed point or the utilization of an external cooling air source (compressors, fans, etc.) does not make any sense in most cases for cost reasons.

Printed publication U.S. Pat. No. 2,578,481 discloses a gas turbine in which an intermediate casing is located between the compressor and the turbine and in which a radially acting auxiliary compressor is arranged on the rotor and cooling air, under pressure, is delivered into the intermediate casing which serves for cooling a bearing of the rotor shaft, the rotor disk of the turbine and also the outer carrier ring for the rotor blades. Cooling of the stator blades and/or rotor blades of the turbine by means of the auxiliary compressor is not provided.

From printed publication U.S. Pat. No. 4,005,572 it is known to arrange auxiliary blades on the rear side of a turbine rotor in a gas turbine in order to induct additional cooling air and to introduce it into the turbine together with the hot gases. Also, cooling of the blades of the turbine by means of the auxiliary blades is not provided in this case.

SUMMARY

The present disclosure is directed to a gas turbine including a compressor, which via an air intake inducts and compresses air; a combustion chamber in which a fuel is combusted, using the compressed air, producing a hot gas; and a turbine, equipped with turbine blades, in which the hot gas is expanded, performing work. A first device is provided in order to cool turbine blades with compressed cooling air. The first device includes at least one separate compressor stage which produces compressed cooling air independently of the compressor.

BRIEF DESCRIPTION OF THE DRAWINGS

The invention shall subsequently be explained in more detail based on exemplary embodiments in conjunction with the drawing. In the drawings.

DETAILED DESCRIPTION OF THE PREFERRED EMBODIMENTS

Introduction to the Embodiments

It is therefore an object of the invention to create a gas turbine which avoids the cooling-related disadvantages of known gas turbines and is distinguished by improved efficiency.

This and other objects are achieved by the features of the appended claims.

The invention is based on a gas turbine comprising a compressor, which, via an air intake, inducts and compresses air, a combustion chamber, in which a fuel is combusted, using the compressed air, and a hot gas is produced, and also a turbine, equipped with turbine blades, in which the hot gas is expanded, performing work, wherein first means are provided in order to cool turbine blades with compressed cooling air. According to the invention, the first means comprise at least one separate compressor stage which produces compressed cooling air independently of the compressor.

In one embodiment of the gas turbine according to the invention, the at least one compressor stage is arranged aft of the turbine in the flow direction.

In another embodiment, the turbine has a rotor or a shaft, and in that the at least one compressor stage is integrated into the rotor or into the shaft.

According to a further embodiment, the at least one compressor stage is designed as a radial compressor.

In another embodiment, the at least one compressor stage is arranged directly aft of the last turbine rotor blades in the flow direction, the at least one compressor stage inducts a cooling air mass flow from a rotor-bearing plenum, and the at least one compressor stage delivers a main mass flow of compressed cooling air to the last turbine rotor blades for cooling purposes.

According to yet another embodiment, the at least one compressor stage delivers a partial mass flow of compressed cooling air for the purging of a sealing gap between rotor or shaft and an adjoining stationary part of the gas turbine.

In a further embodiment, the at least one compressor stage has an outer shroud, and the partial mass flow is delivered through an exit point in the shroud.

It is particularly advantageous if the main mass flow at the exit of the at least one compressor stage is deflected from the radial direction into an axial direction, and if the rotor or the shaft is provided with an exit radius at this point.

DETAILED DESCRIPTION

A part of the invention is the idea of integrating separate compressor stages on the gas-turbine shaft, with the principal object of explicitly generating only cooling air at the required pressure level. Therefore, the individual stages can be designed in a manner optimized to the requirements of the cooling and no consideration needs to be given to cooling during compression of the main mass flow of combustion air. The creation of the necessary pressure level can be carried out by all available types of compressors (axial, radial or diagonal). Also conceivable is utilization of the surge effect through simple passages on/in the rotor.

Figure 1:
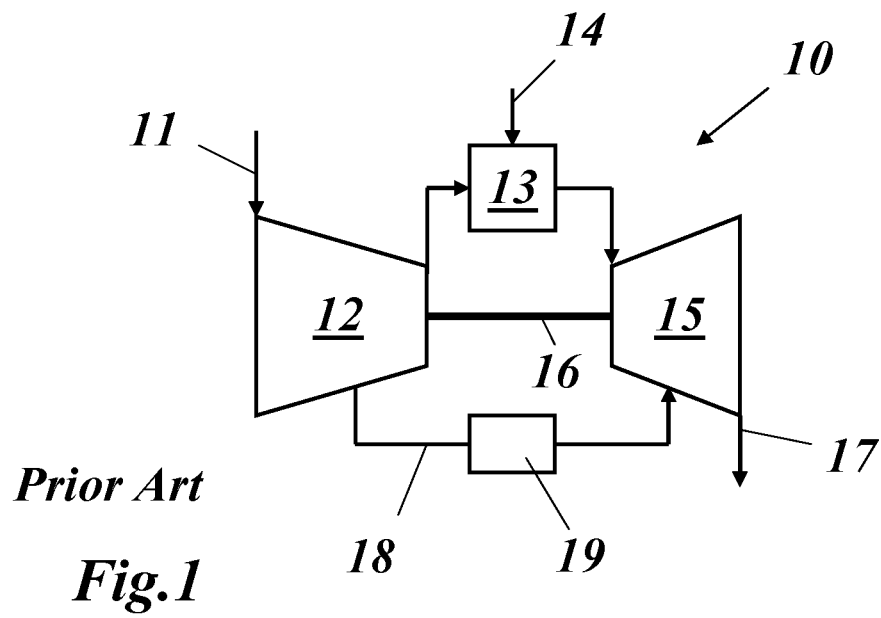
FIG. 1 shows a greatly simplified schematic diagram of a gas turbine from the prior art, in which cooling air which is tapped from the compressor is used for cooling the turbine.
Figure 2:
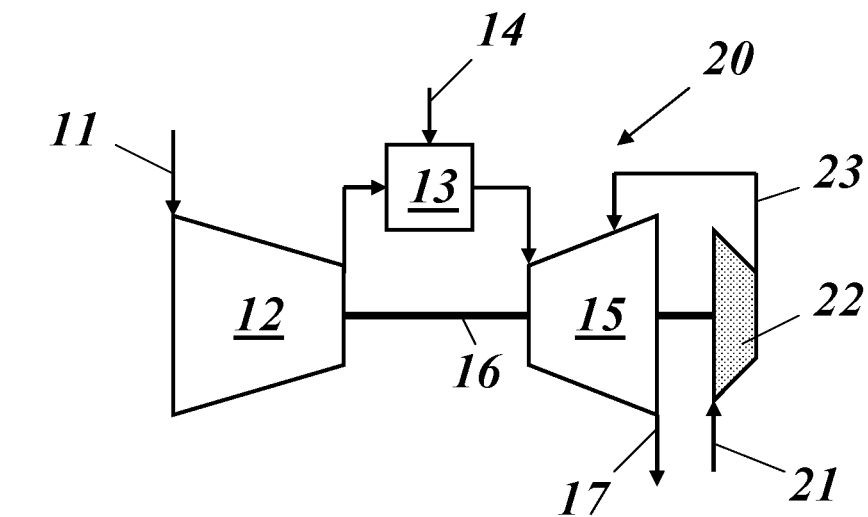
FIG. 2 shows a schematic diagram, comparable to FIG. 1, for a gas turbine according to an exemplary embodiment of the invention.

FIG. 2 shows in a schematic diagram, comparable to the FIG. 1, a (generalized) exemplary embodiment of the invention. The gas turbine 20 of FIG. 2 has the same core elements 11-17 as the gas turbine 10 of FIG. 1. The cooling of the turbine, however, is of a different design. For producing the compressed cooling air, a separate compressor stage 22 is arranged on the rotor 16 aft of the turbine 15. The compressor stage 22 obtains cooling air from a cooling air source 21 and delivers the compressed cooling air to the turbine 15 via a cooling air line 23.

Figure 3:
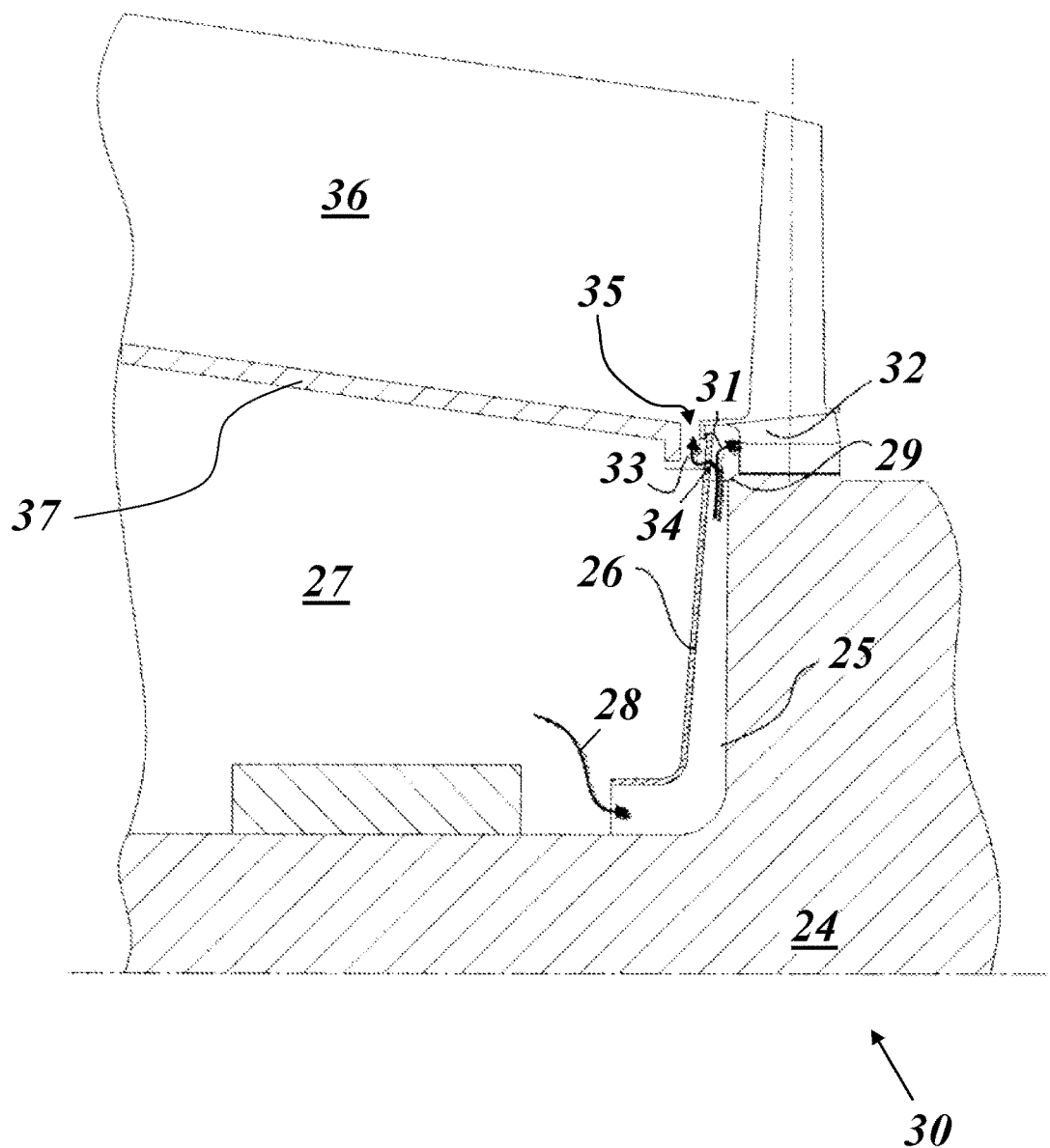
FIG. 3 shows in a detail a longitudinal section through a gas turbine having a separate compressor stage which is integrated into the rotor according to an exemplary embodiment of the invention.

A specific embodiment of such a separate compressor stage is reproduced in FIG. 3. The example which is produced there refers to the cooling air feed for the last stage of the axial turbine of a gas turbine 30. A radial compressor 25 together with a shroud 26 is integrated into the turbine-side end of the rotor or of the shaft 24. This radial compressor inducts a cooling air mass flow 28 of a lower pressure level from a rotor-bearing plenum 27, which cooling air mass flow, as a result of the principle of operation of the radial compressor 25, is compressed to the necessary higher pressure level.

A main mass flow 31 leaves the compressor at a deflection point with an exit radius 29 and is fed there to the turbine rotor blades 32 for cooling purposes. In the depicted example, a partial mass flow 33 of the compressed cooling air is tapped at an exit point 34 of the shroud 26 in order to purge an adjacent sealing gap 35 between a stationary part 37 of the gas turbine 30 and the rotor 24 and to then enter the exhaust gas duct 36 of the gas turbine 30.

In addition, the mass flow which is inducted by means of the separate compressor which is integrated into the interior of the machine can also be used for cooling any static and/or rotating components (bearing region, casing and their support structures).

LIST OF DESIGNATIONS 10, 20, 30 Gas turbine
11 Air intake
12 Compressor
13 Combustion chamber
14 Fuel
15 Turbine
16 Rotor
17 Exhaust gas outlet
18, 23 Cooling air line
19 Cooler
21 Cooling air source
22 Compressor stage
24 Rotor/shaft
25 Radial compressor
26 Shroud
27 Rotor-bearing plenum
28 Cooling air mass flow
29 Exit radius
31 Main mass flow
32 Turbine rotor blades
33 Partial mass flow
34 Exit point (partial mass flow)
35 Sealing gap
36 Exhaust gas duct
37 Stationary part (stator)

What is claimed is:

1. A gas turbine, comprising:
a compressor, which via an air intake inducts and compresses air;
a combustion chamber in which a fuel is combusted, using the compressed air, producing a hot gas;
a turbine, equipped with turbine blades, in which the hot gas is expanded; and
at least one separate compressor, which produces compressed cooling air independently of the compressor, and wherein the compressed cooling air from the at least one separate compressor cools the turbine blades, wherein the at least one separate compressor arranged directly aft of the last turbine rotor blades in the flow direction, the at least one separate compressor inducts a cooling air mass flow from a rotor-bearing plenum, and the at least one separate compressor delivers a main mass flow compressed cooling air to the last turbine rotor blades for cooling purposes, and wherein the at least one separate compressor delivers a partial mass flow of compressed cooling air for the purging of a sealing gap between the rotor or shaft and an adjoining stationary part of the gas turbine.

2. The gas turbine as claimed in claim 1, wherein the turbine has a rotor or a shaft, and the at least one separate compressor is integrated into the rotor or into the shaft.

3. The gas turbine as claimed in claim 1, wherein the at least one separate compressor is a radial compressor.

4. The gas turbine as claimed in claim 1, wherein the at least one separate compressor has an outer shroud, and the partial mass flow is delivered through an exit point in the shroud.

5. A gas turbine, comprising:
a compressor, which via an air intake inducts and compresses air;

a combustion chamber in which a fuel is combusted, using the compressed air, producing a hot gas;
a turbine, equipped with turbine blades, in which the hot gas is expanded; and
at least one separate compressor, which produces compressed cooling air independently of the compressor, and wherein the compressed cooling air from the at least one separate compressor cools the turbine blades, wherein the at least one separate compressor arranged directly aft of the last turbine rotor blades in the flow direction, the at least one separate compressor inducts a cooling air mass flow from a rotor-bearing plenum, and the at least one separate compressor delivers a main mass flow compressed cooling air to the last turbine rotor blades for cooling purposes, and wherein the main mass flow at the exit of the at least one separate compressor is deflected from a radial direction into an axial direction, and in that the rotor or the shaft is provided with an exit radius where deflection from a radial direction to an axial direction occurs.

6. The gas turbine as claimed in claim 5, wherein the turbine has a rotor or a shaft, and the at least one separate compressor is integrated into the rotor or into the shaft.

7. The gas turbine as claimed in claim 5, wherein the at least one separate compressor is a radial compressor.

\* \* \* \* \*